(12) United States Patent
Hwang et al.

(10) Patent No.: US 10,599,615 B2
(45) Date of Patent: Mar. 24, 2020

(54) SYSTEM, METHOD, AND RECORDING MEDIUM FOR RECYCLE BIN MANAGEMENT BASED ON COGNITIVE FACTORS

(71) Applicant: International Business Machines Corporation, Armonk, NY (US)

(72) Inventors: Jinho Hwang, Ossining, NY (US); Ruchi Mahindru, Elmsford, NY (US); Clifford A. Pickover, Yorktown Heights, NY (US); Valentina Salapura, Chappaqua, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 740 days.

(21) Appl. No.: 15/186,752

(22) Filed: Jun. 20, 2016

(65) Prior Publication Data

US 2017/0364528 A1    Dec. 21, 2017

(51) Int. Cl.
*G06F 16/16*    (2019.01)
*G06N 20/00*    (2019.01)

(52) U.S. Cl.
CPC ........... *G06F 16/162* (2019.01); *G06N 20/00* (2019.01)

(58) Field of Classification Search
CPC .................. G06N 99/005; G06F 17/30117
See application file for complete search history.

(56) References Cited

U.S. PATENT DOCUMENTS

| 2003/0046401 | A1* | 3/2003 | Abbott ................. G06F 9/451 709/228 |
| 2013/0179479 | A1 | 7/2013 | Chakra et al. |
| 2016/0171197 | A1 | 6/2016 | Song et al. |
| 2017/0003861 | A1 | 1/2017 | Kim et al. |
| 2017/0024228 | A1 | 1/2017 | Chen et al. |
| 2017/0357846 | A1* | 12/2017 | Dey ..................... G06K 9/0061 |

* cited by examiner

*Primary Examiner* — Vincent Gonzales
*Assistant Examiner* — Seth Andrew Raker
(74) *Attorney, Agent, or Firm* — Anthony Curro, Esq.; McGinn IP Law Group, PLLC (57) ABSTRACT

A recycle bin management method, system, and non-transitory computer readable medium, include a cognitive detection circuit configured to detect a cognitive state and a cognitive characteristic of a user at a time when the user is performing a first deletion of a file to a recycle bin and a file tagging circuit configured to tag the file with a cognitive indicator based on the cognitive state and cognitive characteristic of the user, the cognitive indicator altering a visual display of the file in the recycle bin to indicate the cognitive state and the cognitive characteristic of the user before the user performs a second deletion to delete the file from the recycle bin.

20 Claims, 5 Drawing Sheets

RECYCLE BIN MANAGEMENT METHOD 200

SYSTEM, METHOD, AND RECORDING MEDIUM FOR RECYCLE BIN MANAGEMENT BASED ON COGNITIVE FACTORS

BACKGROUND

The present invention relates generally to a recycle bin management system, and more particularly, but not by way of limitation, to a system for managing the contents of an electronic recycle bin (e.g., deleted files) based on a user's cognitive state at the time of deletion.

Conventionally, recycling bins (e.g., electronic "trash cans" or related repositories) on a computer system (or email program) store deleted files until the user determines at a later time to permanently delete the files of the recycling bin. This enables users to review the contents of the recycle bin before deleting the items permanently.

However, there is a technical problem in the conventional techniques in that users of the recycle bins, trash cans, and related repositories have difficulty managing the deleted files. For example, a user may not be certain if they truly wish to discard a file, or the user may have acted impulsively on the initial deletion and the file should never have been deleted in the first place. Due to the time between the initial deletion and the management of a recycle bin, often users have trouble identifying if the files were accidentally deleted or if their state of mind could have led to carelessness in deletion. And, once the recycle bin or trash can is emptied, users typically cannot easily recover the files. Users often do not have time to decide on whether or not a file should truly be discarded forever. Additionally, files often deplete valuable space in email systems (with limited storage amounts allowed).

SUMMARY

In view of the technical problem, the inventors have considered a non-abstract improvement to a computer technology via a technical solution to the technical problem in which a system can automatically and selectively determine or change the management of files in the recycle bin based on cognitive characteristics and states such that the user can more accurately determine if the file should be permanently deleted.

In an exemplary embodiment, the present invention can provide a recycle bin management system, including a cognitive detection circuit configured to detect a cognitive state and a cognitive characteristic of a user at a time when the user is performing a first deletion a file to a recycle bin and a file tagging circuit configured to tag the file with a cognitive indicator based on the cognitive state and cognitive characteristic of the user, the cognitive indicator altering a visual display of the file in the recycle bin to indicate the cognitive state and the cognitive characteristic of the user before the user performs a second deletion to delete the file from the recycle bin.

Further, in another exemplary embodiment, the present invention can provide a recycle bin management method, including detecting a cognitive state and a cognitive characteristic of a user at a time when the user is performing a first deletion a file to a recycle bin and tagging the file with a cognitive indicator based on the cognitive state and cognitive characteristic of the user, the cognitive indicator altering a visual display of the file in the recycle bin to indicate the cognitive state and the cognitive characteristic of the user before the user performs a second deletion to delete the file from the recycle bin.

Even further, in another exemplary embodiment, the present invention can provide a non-transitory computer-readable recording medium recording a recycle bin management program, the program causing a computer to perform: detecting a cognitive state and a cognitive characteristic of a user at a time when the user is performing a first deletion a file to a recycle bin and tagging the file with a cognitive indicator based on the cognitive state and cognitive characteristic of the user, the cognitive indicator altering a visual display of the file in the recycle bin to indicate the cognitive state and the cognitive characteristic of the user before the user performs a second deletion to delete the file from the recycle bin.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
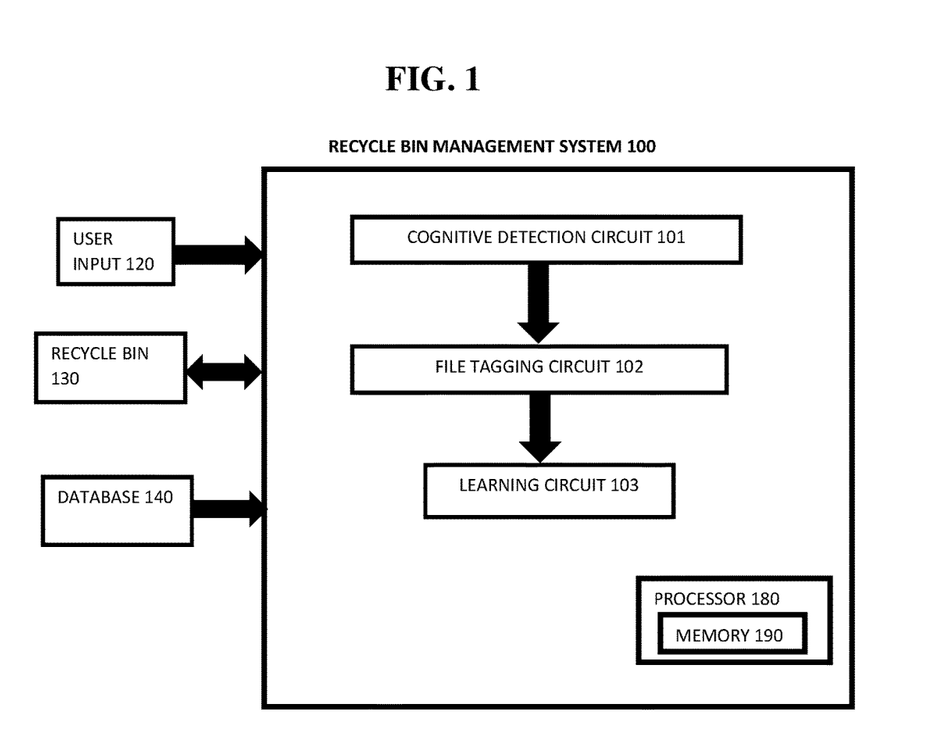
FIG. 1 exemplarily shows a block diagram illustrating a configuration of a recycle bin management system 100.

With reference now to FIG. 1, the recycle bin management system 100 includes a cognitive detection circuit 101, a file tagging circuit 102, and a learning circuit 103. The recycle bin management system 100 includes a processor 180 and a memory 190, with the memory 190 storing instructions to cause the processor 180 to execute each circuit of the recycle bin management system 100. The processor and memory may be physical hardware components, or a combination of hardware and software components.

Although the recycle bin management system 100 includes various circuits, it should be noted that a recycle bin management system can include modules in which the memory 190 stores instructions to cause the processor 180 to execute each module of the recycle bin management system 100.

Also, each circuit can be a stand-alone device, unit, module, etc. that can be interconnected to cooperatively produce a transformation to a result.

With the use of these various circuits, the recycle bin management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
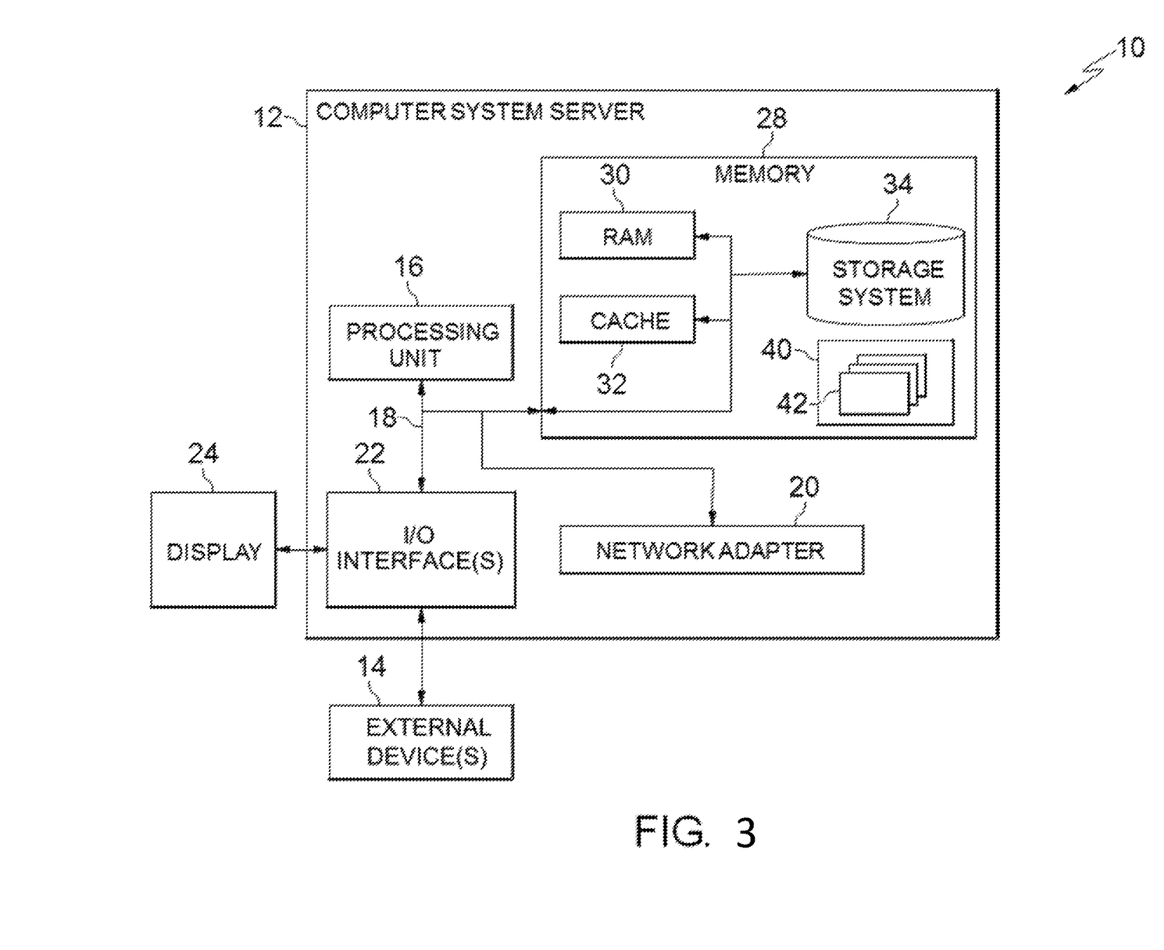
FIG. 3 depicts a cloud computing node 10 according to an exemplary embodiment of the present invention.
Figure 4:
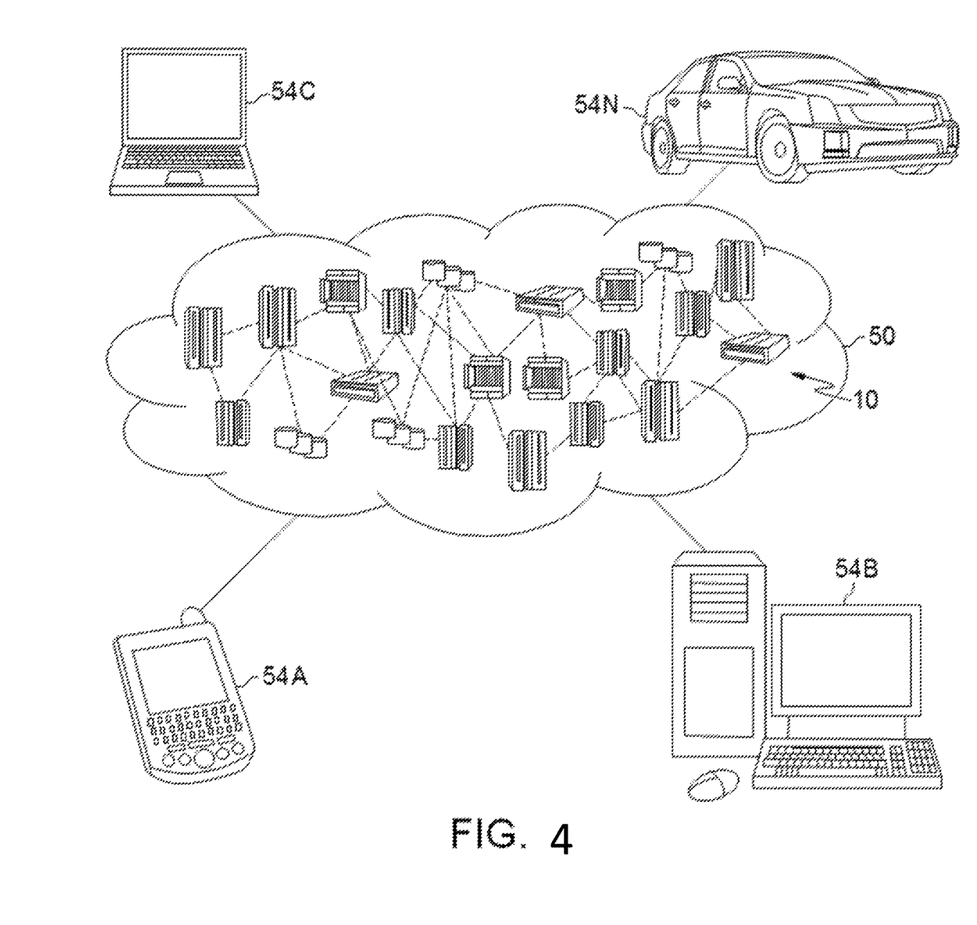
FIG. 4 depicts a cloud computing environment 50 according to another exemplary embodiment of the present invention.
Figure 5:
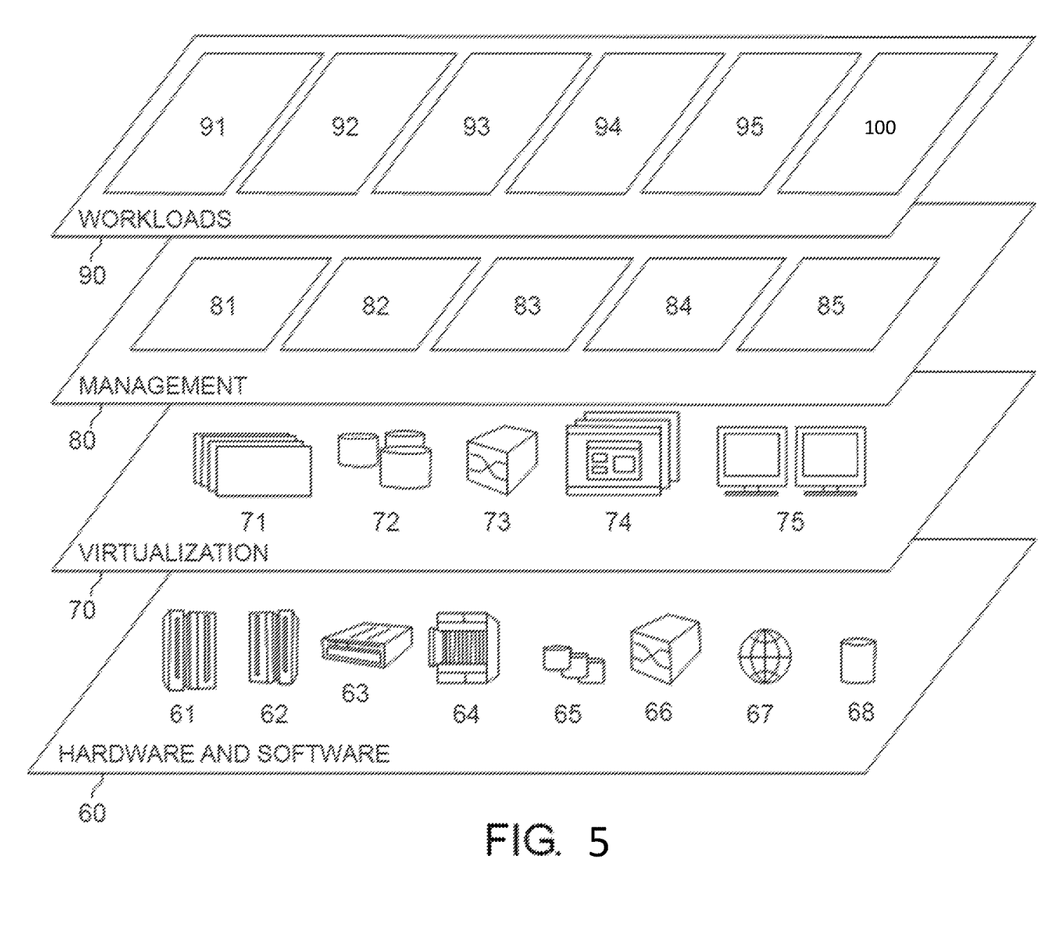
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the recycle bin management system 100 (FIG. 5), it is noted that the present invention can be implemented outside of the cloud environment.

The recycle bin management system 100 receives a user input 120 of the user deleting a file on a computer (e.g., an e-mail server, video game, etc.). Also, the user input 120 includes a user profile which may include a cognitive characteristic such as autism, pre-Alzheimer's, and Attention Deficit Hyperactivity Disorder (ADHD), age, gender, geographical location, etc. In other words, the user profile includes different cohorts (e.g., classes of user) that the user may belong to such that the user can benefit from other users of the same cohort as the system learns via the learning circuit 103 (as described later).

Based on the user input 120 (e.g., at a time the user deletes a file such that the file is moved to the recycle bin 130), the cognitive state detection circuit 101 detects a cognitive state of the user based on real-time readings from data of wearables, sensors (e.g., facial recognition, cameras, eye tracking), social media, a calendar, the number of windows accessed on a computer system in the previous N minutes, etc. Also, the cognitive state detection circuit 101 can detect a cognitive characteristic of the user based on the user profile so as to identify the user as part of a cohort. The cognitive state detection circuit 101 can utilize various approaches for estimating a cognitive state or mood, with a confidence level. That is, the cognitive state detection circuit 101 detects a cognitive feature of the user at the time the user is deleting a file.

The cognitive state detection circuit 101 can measure a cognitive state based on, for example, a level of distraction of a person based on the number of open tasks on a computer desktop, amount of task shifting, whether the phone is ringing, whether people are nearby, calendar information (e g many meetings in a day may increase fatigue), how noisy the environment is, facial expression, keyboard typing behavior, mouse/trackpad usage patterns, the number of people in an office for the last "N" minutes ("N" being an integer), etc. at the time the user used the recycle bin 130.

Other cognitive states may include consideration of major life events (birth/loss), stress, other external events (e.g., running late for a meeting, context switching, multi-tasking, traveling, environment changes etc.). Moreover, the cognitive state detection circuit 101 can measure the cognitive state based on emotions and mood, for example, using a real-time measurement of face-tracking technology to read a facial expression of the user at the time of deletion of a file to determine an emotion or mood (e.g., distracted, angry, rushed, happy, focused, etc.).

In other words, the cognitive detection circuit 101 detects a cognitive state or characteristic of the user at a time that the user deletes an item to the recycle bin 130.

Based on the cognitive state or characteristic (e.g., cognitive feature) of the user at the time that the user deleted the item to the recycle bin 130, the file tagging circuit 102 tags the file with a cognitive indicator (e.g., a file tag) indicating the cognitive state or characteristic. That is, when the file is in the recycle bin 130, the file includes the cognitive indicator via the file tagging circuit 102 of the cognitive state or characteristic such that the user can later assess whether the file should be permanently deleted.

The tagging circuit 102 can also tag the file with a value indicator (e.g., a tag) based on file content and characteristics, such as criticality (e.g., business or personal value) such that the tagged file can include another dimension to be considered when evaluating the impact of a permanent deletion. Thus, a joint assessment of cognitive state and file value may contribute to a multi-dimensional vector that is considered in the assessments when the file tagging circuit 102 tags the file.

It is noted that the file tagging circuit 102 preferably tags the file with the indication of the cognitive state or characteristic after the file has been placed into the recycle bin 130. However, the file tagging circuit 102 can tag the file as the user is performing a "drag-and-drop" operation on a file moving the file to the recycle bin 130 such that the user is immediately aware of the cognitive state or characteristic indicator and can pre-emptively stop the deletion of the file. This feature would create a "two-layer" check on whether the user wishes to delete a file. That is, the user can see the cognitive indication tagged as the user is "dragging and dropping" the file into the recycle bin and make a first decision to continue with the deletion and then at a later time when the user manages the files in the recycle bin 130, the user can again see the cognitive indication of the file and make a second decision to permanently delete the file. Thus, changes in motions of drag-and-drop actions (e.g. if a file is dragged to a trash bin while a user is distracted or angry, the dragging may be slower, as if dragging through a viscous syrup), or a sound accompanies the drag-and-drop can be made by the file tagging circuit 102.

The cognitive indicator and the value indicator can alter a visual representation of the individual files in the recycle bin or the overall look of the repository (e.g. the recycle bin 130 icon is red, bold, size, etc. if 90% (e.g., greater than a threshold) of the contents were deposited while the user was in a distracted state for a particular cohort of users). Different types of cognitive indicators and value indicators can used based on thresholds stored in the database 140. For example, the database 140 can include parameters that any time an angry cognitive state is detected, the files are all marked red or if a focused cognitive state is detected, the cognitive indicator does not change the file display.

Further, the cognitive indicator or value indicator tagged to a file by the file tagging circuit 102 can affect the ease (difficulty) with which files are finally deleted from the repository. For example, certain cognitive indicators or value indicators can require extra verification to delete (e.g., an "are you sure you wish to delete the file" notification if the user had, for example, a certain distraction level when the file was deleted).

Also, the tag by the file tagging circuit 102 can cause a cursor appearance to change.

Moreover, the cognitive indicator can change based on the cognitive characteristic of user. Depending on the cohort of the user detected by the cognitive detection circuit 101, that cohort may benefit from a different about-to-be deleted file representations (or the recycle bin 130 itself) to change color, size, or shape based on the cohort of the user from the user profile (e.g., autism, a child, pre-Alzheimer's, etc.). For example, a child may benefit from only changing the file representations and not the representation of the recycle bin whereas a user in the cohort of pre-Alzheimer's can benefit from the file tagging circuit 102 having a cognitive indicator that changes both the visual representation of the recycle bin 130 and the files within. Or, the tag by the tagging circuit 102 can cause a secondary verification requirement based on the cohort of the user. For example, if the user has pre-Alzheimer, the tag could require a secondary verification or analysis by the user's caregiver.

In one embodiment, a user can "like" a certain style of the tag of the recycle bin 130 or file representations such that the file tagging circuit 102 can utilize this type of tag in the future.

Alternatively, a joint assessment of the cognitive state of the user and history for the user or cohort of the user (e.g., cognitive characteristic) can contribute to a multi-dimensional vector that is considered in the cognitive indicator. For example, in conjunction with cognitive state, the learning circuit 103 can learn from the actions of the user (or cohort that the user is identified with) what type of files, and with what content of the files the user deleted, or decided to recover from the trash bin in the past. For example, if the user in the past recovered some pictures or some tax-related files from the bin that were placed in the bin while a user was distracted, the learning circuit 103 can learn this history and uses the learned data to include additional warnings to the user for these particular types of files. When the next time occurs that the user tries to delete a tax-related file, the file tagging circuit 102 can include a tag that issues warnings such as "Are you sure you want to delete this file? It seems it is tax-related, and you recovered such files from the trash bin in the past when you were distracted."

That is, the learning circuit 103 can learn that in the past a user has decided against deletion of one or more file and hence the file tagging circuit 102 can change the type of tag when a user, belonging to a cohort and with a cognitive state, is about to perform a final deletion with respect to one or more similar files or file types. The learning circuit 103 tracks general behavior of this kind to ascertain a user's general confidence level in decisions about using recycle bins 130.

In other words, the learning circuit 103 can use historical data of the user or a cohort that the user belongs to in order to update the type of tag associated with a file by the file tagging circuit 102 as a particular cognitive state or type of file is deleted. Thus, the system 100 can be "smarter" and customized to a user over time.

Also, the learning circuit 103 can learn from the subsequent behaviors of the user (or cohorts of similar users) and the subsequent cognitive state of the user before/after the file is deleted. For example, if a user shows nervous emotion, opens the trash bin, and searches the file through local computer or cloud-based storage that was previously deleted, the learning circuit 103 can identify the file that was erroneously permanently deleted and cause the file tagging circuit 102 to tag the particular type of file with a different tag next time the user deletes a similar file.

In one embodiment, the value indicator can be based on a type of access/ownership the user has to a file. For example, if the file is part of a shared code that the user does not have complete ownership of but is working on with a group of users, the file tagging circuit 102 can tag the file with a value indicator that does not allow the user to permanently delete the file from the recycle bin 130 unless a system administrator (e.g., a verified user) deletes the file. Thus, the file tagging circuit 102 can additionally prevent deletions of shared data by a single user.

Also, the recycle bin 130 could be a server-side recycle bin system (e.g., in the cloud) for retaining computer files and information. A file manager application running on the local computer system interacts with a file serving application on the server such that there is generated a retained file in the server-side recycle bin.

In one embodiment, the recycle bin 130 can include an extended recycle bin. In such an embodiment, this includes receiving a deletion request of the file from the extended recycle bin, determining a prevent delete setting of the extended recycle bin, deleting the file from the extended recycle bin if the prevent delete setting is enabled, prevent deletion of a corresponding file from a secondary storage, deleting the file from the extended recycle bin if the prevent delete setting is not enabled, and deleting the corresponding file from the secondary storage.

Although the system 100 was described generally relating to email and a recycle bin on a computer, the system 100 can be included in a mobile phone and manage deleted messages, applications, voicemails, contacts, etc. Also, the system 100 may also have application in virtual worlds and 3D games, when various inventory items (e.g., virtual pets, devices, etc.) are discarded.

Further, some recycle bins 130 include a soft-delete timing (e.g. when a file may "really" disappear from a trash bin either by a user deletion or at a predetermined set of time (i.e., once a month, once a week, etc.)). The soft-delete timing can be altered or ignored (e.g., file not deleted) based on the tag associated with the file. Thus, control can be exercised to prevent the indefinite retention of email messages that may contain sensitive or other confidential information as well as take into consideration the cognitive state of the user at the time of deletion. That is, if the user does not check the recycle bin 130 and the soft-delete timing is occurring, if the file has a tag that indicates the user was 90% distracted, the file may be prevented from being deleted. For example, if a user deletes an e-mail, it will go into the email recycle bin and stay in the recycle bin for a soft-delete timing such as two weeks, and then the system will finally delete it (e.g., a second delete time) forever. The file tagging circuit 102 can tag the file such that the soft-delete time is changed based on the user's cognitive state when the user deletion (e.g., the first deletion) was performed.

In one embodiment, the learning circuit 103 can learn storage amelioration (helping) actions to perform instead of deleting the file (if the user opts not too delete), such as compressing the file, or encrypting it and storing on a cloud storage. The system also learns what type of files are commonly attempted to be deleted by user in various contexts. Haptic feedback may be provided to the user, who may be disengaged, to be alerted of a possible deletion of the high value content.

Further, along with the file tagging circuit 102 (or separately), the user could directly tag a file slated for deletion at the time of deleting the file. That is, the user could tag the file until the users cognitive state or characteristic or emotional state (e.g., "happy", "sad", "angry", etc.) at the time of deletion.

Figure 2:
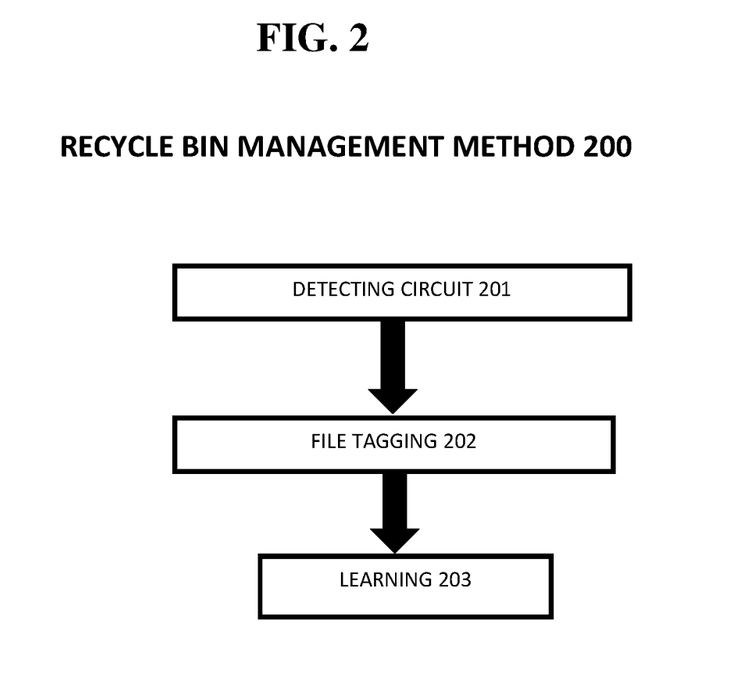
FIG. 2 exemplarily shows a high level flow chart for a recycle bin management method 200.

FIG. 2 shows a high level flow chart for a method 200 of recycle bin management.

Step 201 detects a cognitive feature of the user at the time the user is deleting a file.

Based on the detected cognitive feature of Step 201, Step 202 tags the file with a cognitive indicator (e.g., a file tag) indicating the cognitive state or characteristic of the user at the time the user deleted the file. That is, when the file is in the recycle bin 130, the file includes the cognitive indicator of the cognitive state or characteristic such that the user can later assess whether the file should be permanently deleted. Also, Step 202 can tag the file with a value indicator (e.g., a tag) based on file content and characteristics, such as criticality (e.g., business or personal value) such that the tagged file can include another dimension to be considered when evaluating the impact of a permanent deletion. Thus, a joint assessment of cognitive state and file value may contribute to a multi-dimensional vector that is considered in the assessments when Step 202 tags the file.

Step 203 learns from the past if a user has decided against deletion of one or more files and causes Step 203 to change the type of tag when a user, belonging to a cohort and with a cognitive state, is about to perform a final deletion with respect to one or more similar files or file types. Step 203 tracks general behavior of this kind to ascertain a user's general confidence level in decisions about using trash cans and recycle bins.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the recycle bin management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A recycle bin management system, comprising:
a cognitive detection circuit configured to detect a cognitive state and a cognitive characteristic of a user at a time when the user is performing a first deletion of a file to a recycle bin; and
a file tagging circuit configured to tag the file with a cognitive indicator based on the cognitive state and the cognitive characteristic of the user, the cognitive indicator altering a visual display of the file in the recycle bin to indicate the cognitive state and the cognitive characteristic of the user before the user performs a second deletion to delete the file from the recycle bin.

2. The system of claim 1, further comprising a learning circuit configured to learn if the user performs the second deletion and to cause the file tagging circuit to tag the file with a same cognitive indicator or a new cognitive indicator based on the user performing or not performing the second deletion, respectively.

3. The system of claim 1, further comprising a learning circuit configured to learn a type of cognitive indicator with which to tag the file based on the user being associated with a cohort according to the cognitive characteristic.

4. The system of claim 1, further comprising a learning circuit configured to learn an after-deletion cognitive state of the user after the user performs the second deletion, and to cause the file tagging circuit to use a new cognitive indicator for the file based on the after deletion cognitive state.

5. The system of claim 1, further comprising a learning circuit configured to learn a cohort with which to associate the user based on the cognitive characteristic, and
wherein the file tagging circuit further tags the file with the cognitive indicator based on the cohort.

6. The system of claim 1, wherein the file tagging circuit further tags the file with a value indicator based on a value of the file such that the visual display of the file is altered based on both the value indicator and the cognitive indicator.

7. The system of claim 1, wherein the cognitive indicator further alters a visual display of a cursor.

8. The system of claim 1, wherein the visual display of the file is altered during a drag-and-drop operation of the file to the recycle bin.

9. The system of claim 1, wherein the second deletion comprises a permanent deletion of the file from the recycle bin performed by the user or an automatic deletion function of the recycle bin.

10. The system of claim 1, wherein the visual display alteration caused by the cognitive indicator changes based on a type of the cognitive state.

11. The system of claim 1, wherein the visual display alteration caused by the cognitive indicator changes based on an estimated level of the cognitive state exceeding a threshold value.

12. The system of claim 1, wherein the cognitive indicator further causes a deletion verification message to be delivered to the user when the user performs the second deletion.

13. The system of claim 1, wherein the file tagging circuit further tags the file with a value indicator based on a value of the file, and
wherein the visual alteration of the file is based on a joint assessment of the value indicator and the cognitive indicator.

14. The system of claim 1, wherein the file tagging circuit further tags the file with a secondary user verification tag if the file is owned by a plurality of users.

15. The system of claim 1, wherein the cognitive state comprises a reading of an emotion or mood of the user at the time the file is deleted from data of at least one of wearables, sensors, a social media stream, and a calendar.

16. The system of claim 1, wherein the cognitive characteristic includes a classification of the user to a cohort based on a characteristic of the user in a user profile being related to the cohort.

17. The system of claim 1, wherein the second deletion comprises an automatic deletion function of the recycle bin to delete the file from the recycle bin at a predetermined time, and
wherein the file tagging circuit tags the file to change the predetermined time of the automatic deletion function based on the cognitive state and the cognitive characteristic of the user at the time when the user performed the first deletion of the file.

18. A recycle bin management method, comprising:
detecting a cognitive state and a cognitive characteristic of a user at a time when the user is performing a first deletion of a file to a recycle bin; and
tagging the file with a cognitive indicator based on the cognitive state and the cognitive characteristic of the user, the cognitive indicator altering a visual display of the file in the recycle bin to indicate the cognitive state and the cognitive characteristic of the user before the user performs a second deletion to delete the file from the recycle bin.

19. The method of claim 18, further comprising learning if the user performs the second deletion and tagging the file with a same cognitive indicator or a new cognitive indicator based on the user performing or not performing the second deletion, respectively.

20. A non-transitory computer-readable recording medium recording a recycle bin management program, the program causing a computer to perform:
detecting a cognitive state and a cognitive characteristic of a user at a time when the user is performing a first deletion of a file to a recycle bin; and
tagging the file with a cognitive indicator based on the cognitive state and the cognitive characteristic of the user, the cognitive indicator altering a visual display of the file in the recycle bin to indicate the cognitive state and the cognitive characteristic of the user before the user performs a second deletion to delete the file from the recycle bin.

* * * * *